United States Patent
Haugen et al.

(10) Patent No.: US 10,857,445 B2
(45) Date of Patent: Dec. 8, 2020

(54) SKI WITH COMPOSITE STRUCTURE HAVING ARCUATE FIBERS

(71) Applicant: K2 Sports, LLC, Seattle, WA (US)

(72) Inventors: Darrin J. Haugen, Burien, WA (US); Jedediah Runyan Yeiser, Seattle, WA (US)

(73) Assignee: K2 Sports, LLC, Seattle, WA (US)

( * ) Notice: Subject to any disclaimer, the term of this patent is extended or adjusted under 35 U.S.C. 154(b) by 0 days.

(21) Appl. No.: 16/397,896

(22) Filed: Apr. 29, 2019

(65) Prior Publication Data

US 2019/0329121 A1    Oct. 31, 2019

Related U.S. Application Data

(60) Provisional application No. 62/663,977, filed on Apr. 27, 2018.

(51) Int. Cl.
*A63C 5/12* (2006.01)
*B32B 5/02* (2006.01)
*B32B 21/10* (2006.01)

(52) U.S. Cl.
CPC .............. *A63C 5/12* (2013.01); *B32B 5/02* (2013.01); *B32B 21/10* (2013.01); *B32B 2605/00* (2013.01)

(58) Field of Classification Search
CPC .. A63C 5/12; A63C 5/124; B32B 5/02; B32B 21/10
See application file for complete search history.

(56) References Cited

U.S. PATENT DOCUMENTS

| | | | |
|---|---|---|---|
| 3,393,918 A | 7/1968 | Styka | |
| 3,635,482 A * | 1/1972 | Holman | A63C 5/048 280/610 |
| 4,545,597 A * | 10/1985 | Meatto | A63C 5/00 280/610 |
| 4,690,850 A * | 9/1987 | Fezio | B29C 53/665 428/105 |

(Continued)

FOREIGN PATENT DOCUMENTS

AT    293239 B    9/1971
EP    0 249 372 A2    12/1987

OTHER PUBLICATIONS

International Search Report and Written Opinion dated Aug. 13, 2019, issued in corresponding International Patent No. PCT/US2019/029743, filed Apr. 29, 2019, 12 pages.

*Primary Examiner* — Erez Gurari
(74) *Attorney, Agent, or Firm* — Christensen O'Connor Johnson Kindness PLLC

(57) ABSTRACT

A ski includes an elongate core and a fiber reinforced composite layer disposed over the elongate core. The fiber reinforced composite layer has a first plurality of fibers fixed in a resin and a second plurality of fibers fixed in the resin. The first plurality of fibers extend along a first arcuate path from a left side of the ski to a right side of the ski such that the angle of the first fibers with respect to the centerline increases from the left side to the right side. The second plurality of fibers extend along a second arcuate path from the right side of the ski to the left side of the ski such that the angle of the second fibers with respect to the centerline increases from the right side to the left side. In some embodiments the first and second plurality of fibers are symmetrically positioned in the composite layer.

13 Claims, 3 Drawing Sheets

(56) References Cited

U.S. PATENT DOCUMENTS

| | | | |
|---|---|---|---|
| 5,544,908 A | 8/1996 | Fezio | |
| 5,769,445 A | 6/1998 | Morrow | |
| 9,539,488 B2 | 1/2017 | Schenk et al. | |
| 2005/0055933 A1 | 3/2005 | Dow et al. | |
| 2006/0141232 A1 | 6/2006 | Ma | |
| 2006/0181061 A1* | 8/2006 | Bobrowicz | A63C 5/12 |
| | | | 280/602 |
| 2006/0275133 A1 | 12/2006 | Wang | |
| 2009/0035529 A1 | 2/2009 | Kümpers et al. | |
| 2017/0172331 A1* | 6/2017 | Publicover | A63B 5/11 |
| 2019/0329121 A1* | 10/2019 | Haugen | F16C 3/026 |

\* cited by examiner

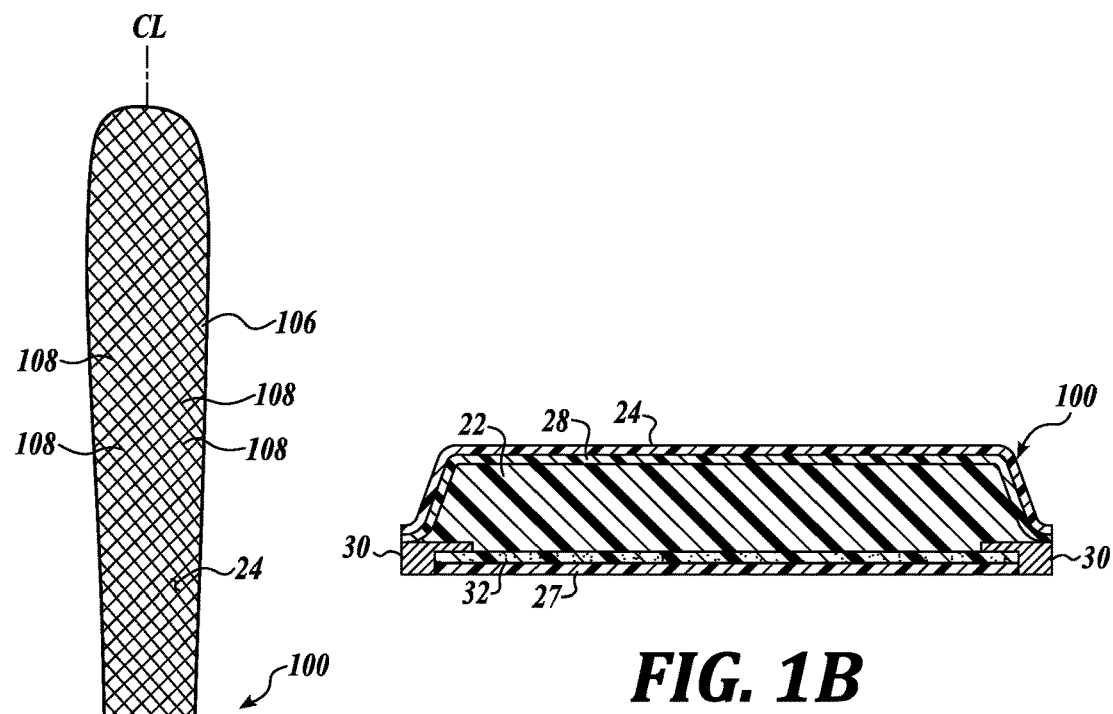
FIG. 1B
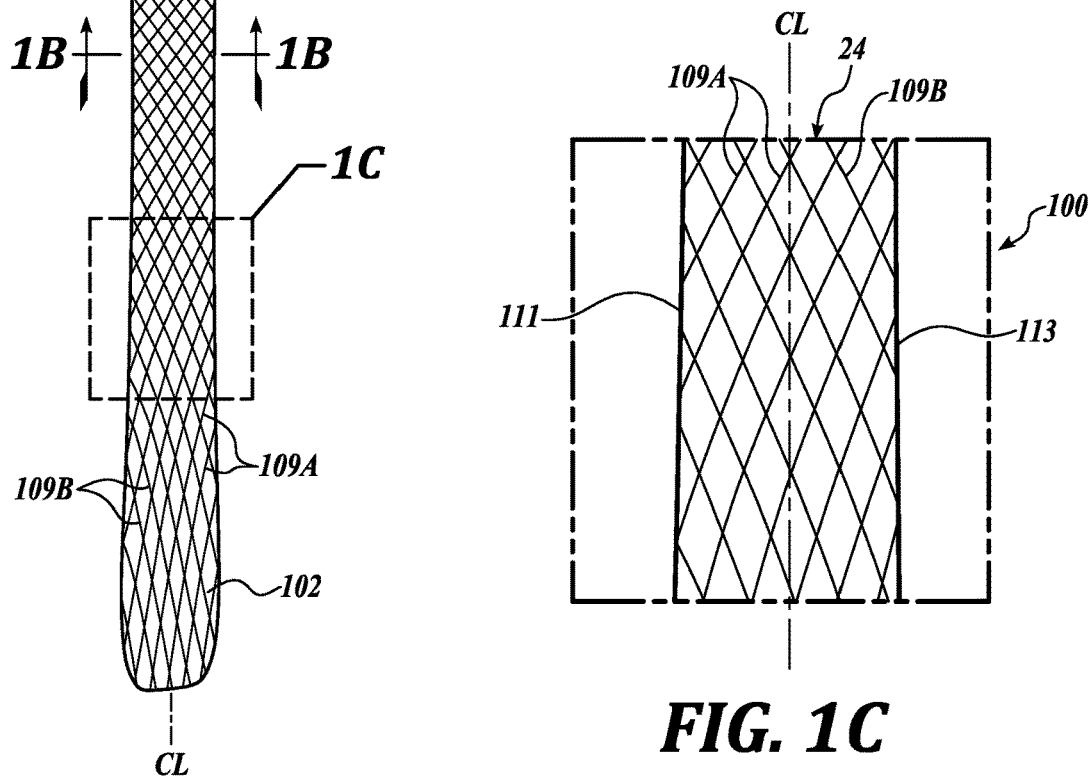
FIG. 1A
FIG. 1C

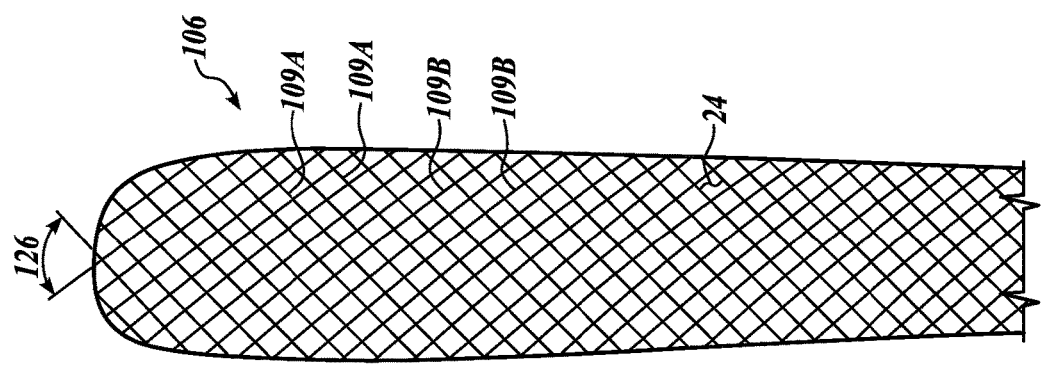
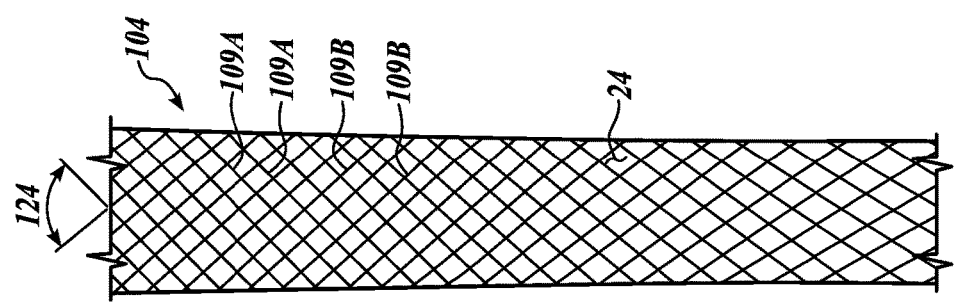
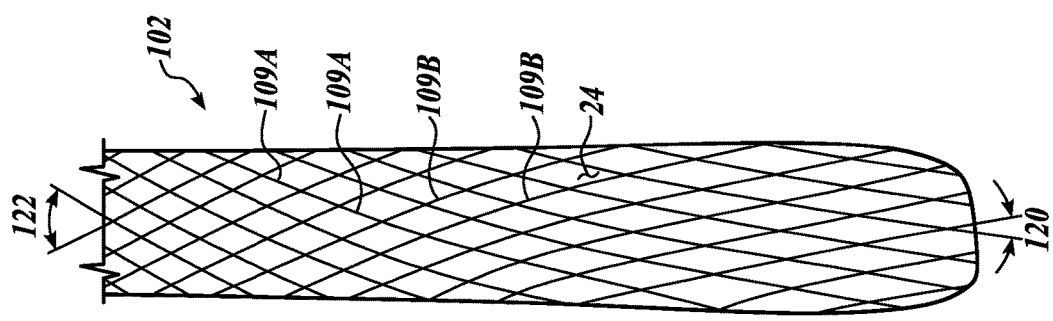

SKI WITH COMPOSITE STRUCTURE HAVING ARCUATE FIBERS

CROSS-REFERENCE TO RELATED APPLICATION

This application claim the benefit of U.S. Provisional Patent Application No. 62/663,977, filed Apr. 27, 2018, which is hereby incorporated by reference in its entirety.

BACKGROUND

The present invention relates to gliding boards, for example skis and snowboards, that include one or more fiber reinforced composite structural layers. Unless explicitly indicated otherwise, references to skis in the present application encompass other types of gliding boards including snowboards and the like. In a conventional ski construction a core is layered with and/or enclosed by, two or more such structural layers disposed above and below the core. The ski will typically include other components, for example, left and right longitudinal edges, a base, and a top sheet.

The core is the central structure in the ski and may be formed from wood, for example laminated strips of hardwood, or from a polymeric foam. The composite layers may be formed from a fiber reinforced composite material, for example fiberglass, or materials using carbon fiber, para-aramid synthetic fibers, or natural fibers, wherein the fibers are embedded or fixed in a suitable resin. Some skis include several composite layers to provide desired strength and flexibility properties, and may include layers that do not extend along the entire length of the ski.

The composite layers provide most of a ski's torsional strength. Several configurations of composite layers are known in the art. For example, in a cap construction an upper composite layer is channel-shaped and is disposed over the top and sides of the core. The upper composite layer is attached directly to a lower composite layer to form a box-beam-type structure enclosing the core. In a sandwich laminated construction upper and lower composite layers are layered on either side of the core, and are joined by separate sidewalls. A protective and/or decorative outer layer, for example, a transparent polyurethane layer, may be attached over an upper surface of the gliding board.

For example, in one prior art method, "wet wrap" or "torsion box" skis are formed by impregnating a sheet of fiberglass fabric with resin, and wherein individual fibers in the sheet are oriented to form a substantially constant fiber angle or orientation with respect to the longitudinal axis (or centerline) of the ski as they cross the ski. The core and any other internal components of the ski, such as fiberglass mat or a bias-ply pre-cured fiberglass strip, are placed in the center of the unidirectional glass fibers with resin applied. The unidirectional glass fibers are wrapped tightly around the ski core and the assembly is placed in a mold, the base assembly set on top, and the mold closed. The assembly is then cured and the ski is removed from the mold. The finishing process steps typically include sanding, topping, finishing, and other cosmetic operations.

The performance, ease of use, and the "feel" of a ski in particular snow conditions are determined by the particular properties of the ski. The length of a ski, its torsional and flexion properties, its weight and swing weight, its shape, the position and shape of the edges, and the like can all affect the user's experience using the ski. The selection of these various physical parameters involves design tradeoffs. For example, longer skis generally provide greater directional stability and generally provide a more stable gliding surface, but they are generally more difficult to use because they are more unwieldy to maneuver and have a greater moment of inertia about the user's axis, e.g., a greater swing weight. The swing weight may be reduced by shortening the length of the skis or by making the skis lighter. The length of the skis is important, however, for achieving good directional stability and a comfortable glide over the snow.

The torsional properties of the ski are an important property for achieving a desired performance from the ski. Generally, orienting the reinforcing fibers of the composite layer(s) at forty-five degrees to the longitudinal axis of the ski core provides the highest torsional rigidity or stiffness to the ski. Conversely, orienting the reinforcing fibers at a smaller angle to the longitudinal axis of the ski, for example, between zero degrees and forty degrees, imparts higher longitudinal stiffness (but lower torsional stiffness). In some prior art skis, a randomly oriented fiber mat is used to increase the torsional rigidity of the ski, but this construction results in unnecessarily increasing the ski weight and expense since only a small percentage of the mat fibers are oriented at angles which enhance torsional stiffness.

However, it is desirable to provide a non-uniform longitudinal and torsional stiffness along the length of the ski. For example, it may be desirable to provide greater longitudinal stiffness in the fore and/or aft body section of the ski and to provide greater torsional stiffness in the center section of the ski. In other examples, it may be desirable to provide greater longitudinal stiffness in the aft body section and greater torsional stiffness in the fore body and center sections.

Prior art methods to achieve different longitudinal and torsional stiffness properties in different sections of the ski typically require making separate fabric sections for each desired ski section, and applying these sections adjacent each other. However, this construction results in a joint having discontinuous fiber orientations, for example fibers oriented at forty-five degrees on one side of the joint, and at a significantly lower angle on the opposite side of the joint. In other prior art methods additional composite layers are applied over a first structural layer, but only to relatively short longitudinal sections of the ski, i.e., only along a portion of the length of the ski. This method also produces discontinuous joints in the structural component. Disadvantages to these prior art ski constructions are that the complexity of the ski is increased, and significant additional steps are required for production of the ski adding cost and opportunity for error. Also the discontinuous fiber orientations at the joints produce discontinuous torsional properties in the ski which impact the ski performance, and may introduce new failure modes in the ski.

When fiber angles of a reinforcement are constant, the torsional and longitudinal stiffness characteristics they impart to a ski are coupled and determined by the distance between the fibers in question and the neutral axis of the ski or snowboard. By using multiple, disjoint sections of reinforcement, the degree to which those fibers contribute to the torsional and longitudinal stiffness of the ski can be varied, but always in a discontinuous fashion, and within any one of those sections the two characteristics (longitudinal stiffness, torsional stiffness) are completely coupled to each other. It would be an advantage in the art to produce skis with a layer comprised of fibers that have a continuously varying fiber angle, thereby decoupling the torsional and longitudinal stiffness contribution of each fiber while avoiding any discontinuities in either stiffness profile.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Skis or other gliding boards are disclosed that include an elongate core and a fiber reinforced composite layer disposed over the core. The fiber reinforced composite layer includes a first plurality of fibers fixed in a resin that extend along a first arcuate path from a left side of the ski to a right side of the ski such that the angle of the first fibers with respect to the centerline increases from the left side to the right side. A second plurality of fibers fixed in the resin extend along a second arcuate path from the right side of the ski to the left side of the ski such that the angle of the second fibers with respect to the centerline increases from the right side to the left side.

In an embodiment the first plurality of fibers are disposed symmetrically with the second plurality of fibers.

In an embodiment the angle of the first fibers with respect to the centerline monotonically increases along the first arcuate path.

In an embodiment the first plurality of fibers and the second plurality of fibers are disposed on an aft portion of the ski, and further comprising a third plurality of fibers and a forth plurality of fibers that are fixed in the resin and are disposed on a center portion of the skis.

In an embodiment the third plurality of fibers and the fourth plurality of fibers are disposed at forty-five degrees to the center line of the ski.

In an embodiment the first arcuate path from the left side of the ski to the right side of the ski increases from less than twenty-five degrees to more than forty degrees, and the second arcuate path from the right side of the ski to the left side of the ski increases from less than twenty-five degrees tore than forty degrees. In some embodiments a fifth plurality of fibers and a sixth plurality of fibers are fixed in the resin and are disposed on a forward portion of the ski.

In an embodiment the first and second plurality of fibers comprise fiberglass fibers.

In an embodiment a second fiber reinforced composite layer is provided under the elongate core, for example the second fiber reinforced composite layer may include a seventh plurality of fibers fixed in the resin, and with the seventh plurality of fibers extending along a third arcuate path from a left side of the ski to a right side of the ski such that the angle of the seventh fibers with respect to the centerline increases from the left side to the right side. An eighth plurality of fibers fixed in the resin may be provided that extend along a fourth arcuate path from the right side of the ski to the left side of the ski such that the angle of the eighth fibers with respect to the centerline increases from the right side to the left side.

A ski in accordance with the disclosure includes a core defining a longitudinal axis. A first fiber reinforced composite layer is fixed to a bottom side of the core and a second fiber reinforced composite layer is fixed to a top side of the core. The first fiber reinforced composite layer includes (i) a first plurality of fibers fixed in a resin that are fixed by the resin along an arcuate path such that the fibers transition from an orientation on one side of the core of less than thirty degrees from the longitudinal axis to an orientation on an opposite side of the core of at least forty-five degrees from the longitudinal axis, and (ii) a second plurality of fibers fixed in a resin that are fixed by the resin along an arcuate path such that the fibers transition from an orientation on one side of the core of less than thirty degrees from the longitudinal axis to an orientation on an opposite side of the core of at least forty-five degrees from the longitudinal axis.

In an embodiment the first plurality of fibers are disposed symmetrically with the second plurality of fibers.

In an embodiment the first plurality of fibers cross the second plurality of fibers.

In an embodiment the first plurality of fibers and the second plurality of fibers are disposed on an aft portion of the ski, and further comprising a third plurality of fibers and a forth plurality of fibers that are fixed in the resin and are disposed on a center portion of the skis.

In an embodiment the third plurality of fibers and the fourth plurality of fibers are disposed at forty-five degrees to the longitudinal axis.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1A is a plan view of a ski in accordance with the present invention, wherein the approximate orientation of reinforcing fibers in the ski's structural composite material is indicated by a plurality of lines on the surface of the ski;

FIG. 1B is a cross-sectional view of the ski shown in FIG. 1A;

FIG. 1C is a fragmentary view showing a short intermediate section of the ski shown in FIG. 1A;

FIG. 2 illustrates an aft body section of the ski shown in FIG. 1A;

FIG. 3 illustrates a center body section of the ski shown in FIG. 1A;

FIG. 4 illustrates a fore body section of the ski shown in FIG. 1A; and

DETAILED DESCRIPTION

Figure 5:
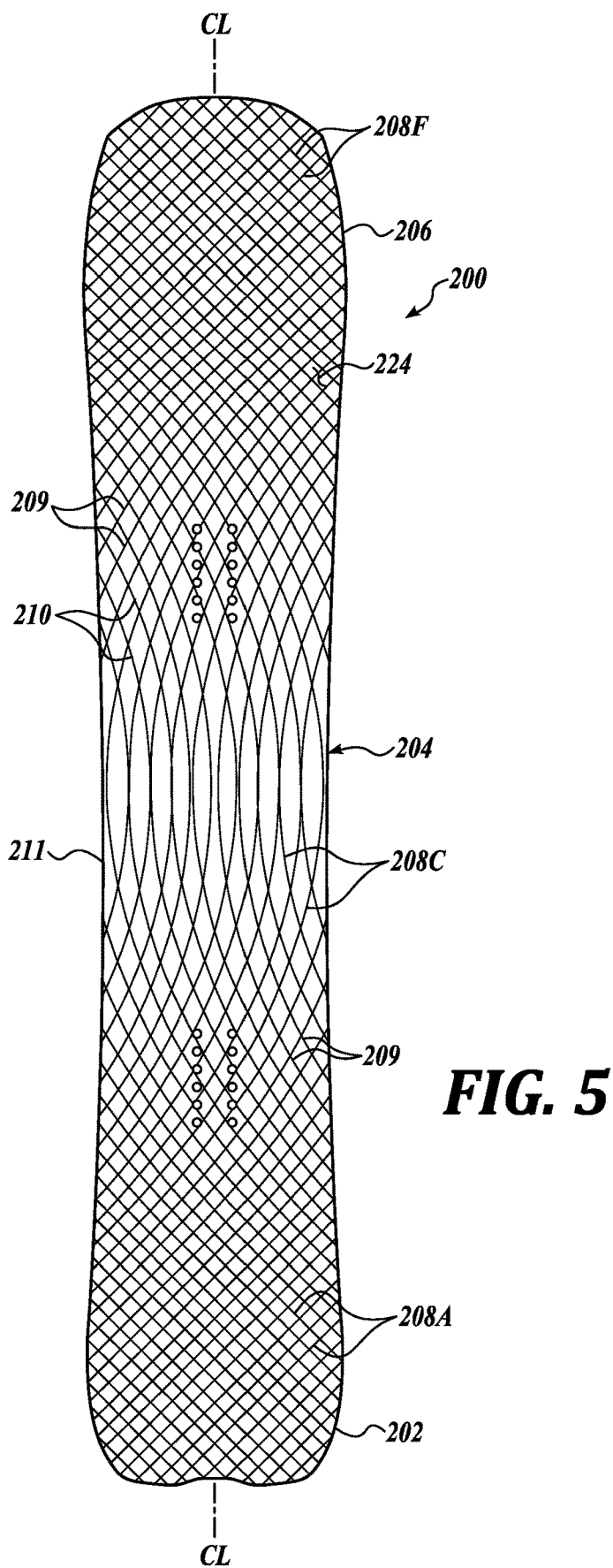
FIG. 5 is a plan view of another embodiment of a gliding board in accordance with the present invention, wherein the gliding board is a snowboard, and local orientation of fibers in the composite structural layer are indicated by a plurality of lines on the upper surface of the gliding board.

Gliding boards, for example skis or snowboards, in accordance with the present disclosure typically include a fiber reinforced composite ("FRC") layers that are fixed to a ski core or core assembly. Skis in accordance with the present disclosure include one or more FRC composite layers or members wherein at least some of the reinforcing fibers are fixed in desired arcuate orientations within the resin to produce torsional and longitudinal stiffness properties that vary along the length of the ski, without introducing joints that produce discontinuous fiber orientations. The reinforcing fibers are configured to produce a ski having desired longitudinal and torsional stiffness properties that vary smoothly along the length of the ski, and that do not introducing discontinuities in the structural members that could adversely affect the performance, structural reliability, and durability of the ski.

The arcuate reinforcing fibers in the composite layers may be disposed along continuous curved paths within the resin, forming a smoothly varying angle with respect to the longitudinal axis of the ski. The curvature of the arcuate fibers in the composite layer(s) are varied along the length of the ski to produce continuously varying longitudinally stiffness properties in the ski. The term "fibers" or "reinforcing fibers" encompasses any fibrous material for use in a structural composite material, for example, glass, aramid fibers (such as para-aramid synthetic fibers), carbon, polyester, or natural fibers (such as flax), that are suitable for the production of skis.

A current embodiment of a ski 100 in accordance with the present invention is shown in plan view in FIG. 1A. A section view of the ski 100 through section 1B-1B is shown in FIG. 1B and a detail view is shown in FIG. 1C. The ski 100 in this embodiment includes a composite outer layer 24, a composite first upper layer 28, and a composite lower layer 32.

The ski 100 is illustrated with curved intersecting lines 108 that indicate local fiber orientations. Although the uppermost layer 24 is illustrated in the FIGURES it will be appreciated that the local fiber orientations may additionally or alternatively be provided in others of the composite layers of the ski 100. For example, the lines 108 may indicate fiber orientations for all of the composite layers 24, 28, 32. As seen most clearly in FIG. 1A, orientation and curvature of the fibers gradually varies along the length of the ski 100. Some fibers may have no curvature (straight fibers), while other fibers have significant concavity. It will also be appreciated that the curvature and orientation of the fibers evolve in the axial direction of the ski to produce smoothly varying fiber orientation, and therefore smoothly varying torsional stiffness properties in the ski. In the ski 100 the orientation of some of the fibers in one or more of the composite layers 24, 28, 32 transitions from relatively small angles with respect to the centerline at the aft end of the ski 100 to larger angles at locations forward of the front end of the ski. Referring to FIG. 1A and to the detail section views in FIGS. 2-4, the ski 100 includes an aft body section 102, a center body section 104, and a fore body section 106. The precise demarcations of the aft body section 102, the center body section 104, and the fore body section 106 are neither precisely defined nor important to understanding and practicing the present invention. As will be understood by persons of skill in the art, a centerline CL of the ski 100 is herein defined to mean a cross section of the ski perpendicular to the page in FIG. 1A and approximately bisecting the ski 100 into two portions. It will be appreciated by persons of skill in the art that the reinforcing fibers are more densely packed than the lines 108.

Referring now also to FIG. 1B, the ski 100 includes a core 22, for example a wood core, with a generally trapezoidal cross section. The core 22 is enclosed between a lower composite layer 32 and a first upper composite layer 28. A second upper composite layer 24 overlies the first upper composite layer 28. A top sheet (not shown), may be provided over the second upper composite layer 24. A conventional bottom panel, for example a polyethylene layer 27, is fixed to the lower composite layer 32, and metal edges 30 are located on opposite sides of the ski 100.

As seen most clearly in FIG. 1C the fiber orientation in the composite layer 24, for example, includes a first plurality of fibers 109A that extend along an arcuate path from a rearward position on the left side 111 of the composite layer 24 to a more forward position on the right side 113 of the composite layer 24 ("forward-angled fibers" 109A). A second plurality of fibers 109B extend along an arcuate path from a more rearward position on the right side 113 of the composite layer 24 to a more forward position on the left side 111 of the composite layer 24 ("rearward-angled fibers" 109B). The fiber orientations 109A, 109B, therefore, are arranged in a crossing pattern.

For example, in the section shown in FIG. 1C the forward-angled fibers 109A are concave to the lower right, and the rearward-angled fibers 109B are concave to the lower left. Referring to FIG. 2, the fiber orientations 109A, 109B in the aft section 102 are oriented closer to the longitudinal direction at the back end of the section, e.g., angle 120, than at the forward end of the section, e.g., angle 122. The fiber orientations 109A, 109B in the aft section 102 gradually transition from the relatively small angles near the aft end to the larger angles.

In the center section 104 (FIG. 3) the fiber orientations initially continue to transition towards forty-five degrees, and then continue at forty-five degrees to provide maximum torsional stiffness. The forward section 106 (FIG. 4) has more subtle curvature and evolution in the fiber orientations.

In this embodiment the fibers 109A, 109B define a pattern that is approximately symmetrical about the centerline CL. Although it is believed the symmetrical arrangement provided advantages in the performance of the ski 100 and that the ski 100 will produce predictable and comfortable flexure properties during use, it is contemplated that in some applications it may be desirable to use a non-symmetric fiber configuration.

The curvature of the fibers may change along the length of the fibers, for example, the fibers may extend substantially in a straight line for a portion of their length, and begin curving to a less-shallow angle at a predetermined distance from the back end of the aft body section 102. In this embodiment the curvature of the fibers 109A, 109B is balanced such that at any longitudinal location the forward-angled fibers 109A are angled symmetrically about the centerline CL. It will be appreciated that the angular orientation of the fibers 109A, 109B at a given longitudinal location are not identical in the transverse direction. For example, the angle or local orientation of the fibers at any given longitudinal position may be greater or lesser at the centerline of the ski 100 than nearer to the edges.

In an exemplary method, the composite layer with curved fibers is produced by arranging the fibers for the composite material to desired orientations with at least some of the fibers or portions of the fibers dispose along a smoothly varying arcuate path. A fixative, optionally the composite material resin, may then be applied to the fibers. In an embodiment a fixative is sprayed onto the arranged fibers. The fixative and fibers form a sheet, with the fibers retained by the fixative in the desired arcuate pattern. The sheet is then cut or trimmed to a desired shape, and additional resin may be applied and the sheet affixed to the ski core 22 or to another structural layer 28 of the ski 100.

The arcuate orientation of the fibers changes along the length of the ski. It is contemplated that the local orientation of the fibers may typically vary from zero degrees (aligned with the centerline) to forty-five degrees or more. For example, the fiber direction in some locations may be ninety degrees with respect to the centerline. Skis in accordance with the present invention may be configured to have higher torsional stiffness in some longitudinal sections (for example the fore body) and higher longitudinal stiffness in other sections (for example the aft body). Moreover, by continuously or gradually varying the orientation of adjacent fibers along the longitudinal direction of the ski, the torsional and longitudinal stiffness properties may be designed to vary continuously and smoothly. The varying properties may be applied to cover the entire ski core structure in a single step, avoiding the use of a patchwork assembly of fiber patches with discontinuous fiber orientations, and "ply drops" that are necessary if multiple patches of fabric are used. The discontinuity that results at the edge of dropped composite ply layers result in high stress areas that are prone to breakage when the ski is flexed. If there are no ply drop areas then the abrupt stiffness change and high stress areas are eliminated. The smoothly varying orientation of the fibers, and resulting continuously varying stiffness profiles also provide a smoother skiing experience to the user.

Another embodiment of a snowboard 200 in accordance with the present invention is shown in FIG. 5. In this embodiment a composite structural layer 224 includes an aft body section 202, a center section 204, and a fore body section 206. The snowboard 200 is illustrated with intersecting curved lines 208A, 208C, 208F on its upper surface that indicate the local orientations of corresponding reinforcing fibers in the structural composite layer 224 in the aft, center and fore body sections.

Crossing reinforcing fibers 208A in the aft body section 202 and crossing reinforcing fibers in the fore body section 208F in the fore body section 206 are oriented at about forty-five degrees to the centerline CL, and are oriented along substantially straight lines. This fiber orientation provides maximum torsional stiffness in the aft body 202 and the fore body 206 sections of the snowboard 200. The crossing reinforcing fibers 208C in the center body section 204 are oriented along arcuate paths in the composite layer 224. For example, the fibers 208C in this embodiment are disposed along circular or elliptical arcs. Some of the reinforcing fibers 209 in the center section 204 that are near to the aft body 202 and to the fore body 206 sections extend across the snowboard 200 from the left side 211 to the right side 213 on an arcuate path. Reinforcing fibers 210 in the center section 204 and nearer to the middle do not cross the snowboard 200, but rather return to the same side 211 or 213. This construction provides very low torsional stiffness in the center section of the snowboard 200.

In this embodiment the fibers 109A, 109B define a pattern that is approximately symmetrical about the centerline CL. Generally it is believed to be desirable to the performance of the ski 100 that the fibers 109A, 109B in the composite structure of the ski 100 are approximately symmetrical about the centerline CL of the ski 100 (for example within +/−5 degrees) so that the ski 100 produces predictable and comfortable flexure properties during use. It is contemplated that in some applications it may be desirable to use a non-symmetric fiber configuration.

While illustrative embodiments have been illustrated and described, it will be appreciated that various changes can be made therein without departing from the spirit and scope of the invention.

The embodiments of the invention in which an exclusive property or privilege is claimed are defined as follows:

1. A ski defining a centerline, the ski comprising:
an elongate core;
a fiber reinforced composite layer disposed over the elongate core, the fiber reinforced composite layer comprising:
a first plurality of fibers fixed in a resin wherein the first plurality of fibers extend along a first arcuate path from a left side of the ski to a right side of the ski such that the angle of the first fibers with respect to the centerline increases from the left side to the right side; and
a second plurality of fibers fixed in the resin wherein the second plurality of fibers extend along a second arcuate path from the right side of the ski to the left side of the ski such that the angle of the second fibers with respect to the centerline increases from the right side to the left side;
wherein the first plurality of fibers are disposed symmetrically with the second plurality of fibers, and the angle of the first fibers with respect to the centerline monotonically increases along the first arcuate path;
and further wherein the first arcuate path from the left side of the ski to the right side of the ski increases from less than twenty-five degrees to more than forty degrees, and the second arcuate path from the right side of the ski to the left side of the ski increases from less than twenty-five degrees to more than forty degrees.

2. The ski of claim 1, wherein the first plurality of fibers and the second plurality of fibers are disposed on an aft portion of the ski, and further comprising a third plurality of fibers and a forth plurality of fibers that are fixed in the resin and are disposed on a center portion of the skis.

3. The ski of claim 2, wherein the third plurality of fibers and the fourth plurality of fibers are disposed at forty-five degrees to the center line of the ski.

4. The ski of claim 2, further comprising a fifth plurality of fibers and a sixth plurality of fibers that are fixed in the resin and are disposed on a forward portion of the ski.

5. The ski of claim 1, wherein the first and second plurality of fibers comprise fiberglass fibers.

6. The ski of claim 1, further comprising a second fiber reinforced composite layer disposed under the elongate core.

7. The ski of claim 6, wherein the second fiber reinforced composite layer comprises:
a first plurality of fibers of the second layer fixed in the resin wherein the first plurality of fibers extend along a third arcuate path from a left side of the ski to a right side of the ski such that the angle of the first fibers with respect to the centerline increases from the left side to the right side; and
a second plurality of fibers of the second layer fixed in the resin wherein the second plurality of fibers extend along a fourth arcuate path from the right side of the ski to the left side of the ski such that the angle of the second plurality of fibers with respect to the centerline increases from the right side to the left side.

8. A ski comprising:
a core defining a longitudinal axis;
a first fiber reinforced composite layer fixed to a bottom side of the core; and
a second fiber reinforced composite layer fixed to a top side of the core;
wherein the first fiber reinforced composite layer comprises (i) a first plurality of fibers fixed in a resin that are fixed by the resin along an arcuate path such that the fibers transition from an orientation on one side of the core of less than thirty degrees from the longitudinal axis to an orientation on an opposite side of the core of at least forty-five degrees from the longitudinal axis, and (ii) a second plurality of fibers fixed in a resin that are fixed by the resin along an arcuate path such that the fibers transition from an orientation on one side of the core of less than thirty degrees from the longitudinal axis to an orientation on an opposite side of the core of at least forty-five degrees from the longitudinal axis.

9. The ski of claim 8, wherein the first plurality of fibers are disposed symmetrically with the second plurality of fibers.

10. The ski of claim 8, wherein the first plurality of fibers cross the second plurality of fibers.

11. The ski of claim 1, wherein the first plurality of fibers and the second plurality of fibers are disposed on an aft portion of the ski, and further comprising a third plurality of fibers and a forth plurality of fibers that are fixed in the resin and are disposed on a center portion of the skis.

12. The ski of claim 11, wherein the third plurality of fibers and the fourth plurality of fibers are disposed at forty-five degrees to the longitudinal axis.

13. A ski defining a centerline, the ski comprising:

an elongate core;

a fiber reinforced composite layer disposed over the elongate core, the fiber reinforced composite layer comprising:

a first plurality of fibers fixed in a resin wherein the first plurality of fibers extend along a first arcuate path from a left side of the ski to a right side of the ski such that the angle of the first fibers with respect to the centerline increases from the left side to the right side; and a second plurality of fibers fixed in the resin wherein the second plurality of fibers extend along a second arcuate path from the right side of the ski to the left side of the ski such that the angle of the second fibers with respect to the centerline increases from the right side to the left side;

further comprising a second fiber reinforced composite layer disposed under the elongate core, wherein the second fiber reinforced composite layer comprises:

a first plurality of fibers of the second layer fixed in the resin wherein the first plurality of fibers extend along a third arcuate path from a left side of the ski to a right side of the ski such that the angle of the first fibers with respect to the centerline increases from the left side to the right side; and a second plurality of fibers of the second layer fixed in the resin wherein the second plurality of fibers extend along a fourth arcuate path from the right side of the ski to the left side of the ski such that the angle of the second plurality of fibers with respect to the centerline increases from the right side to the left side.

* * * * *